July 16, 1946.    W. E. BRILL    2,403,905
ENGINE ACCESSORY DRIVE
Filed Nov. 13, 1942    2 Sheets-Sheet 1
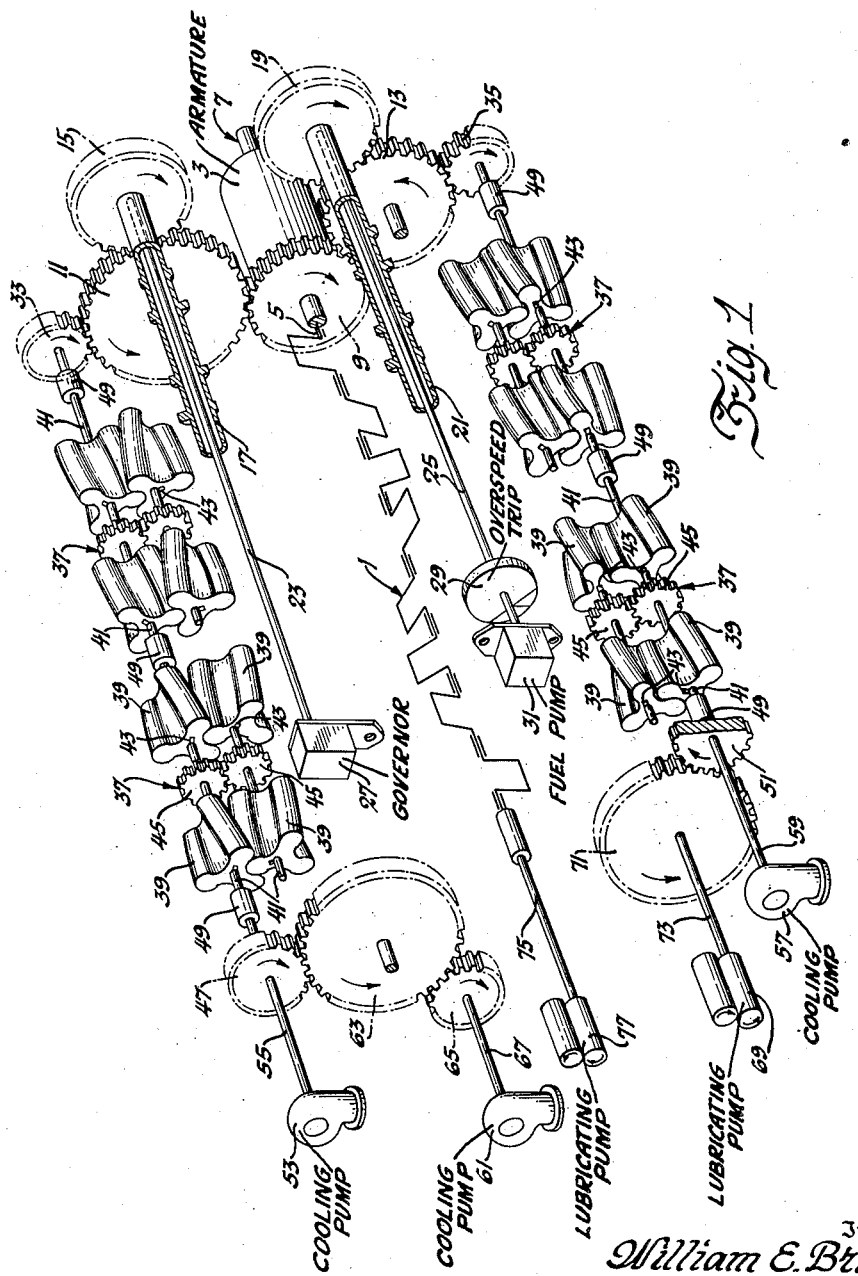

July 16, 1946.  W. E. BRILL  2,403,905
ENGINE ACCESSORY DRIVE
Filed Nov. 13, 1942  2 Sheets-Sheet 2
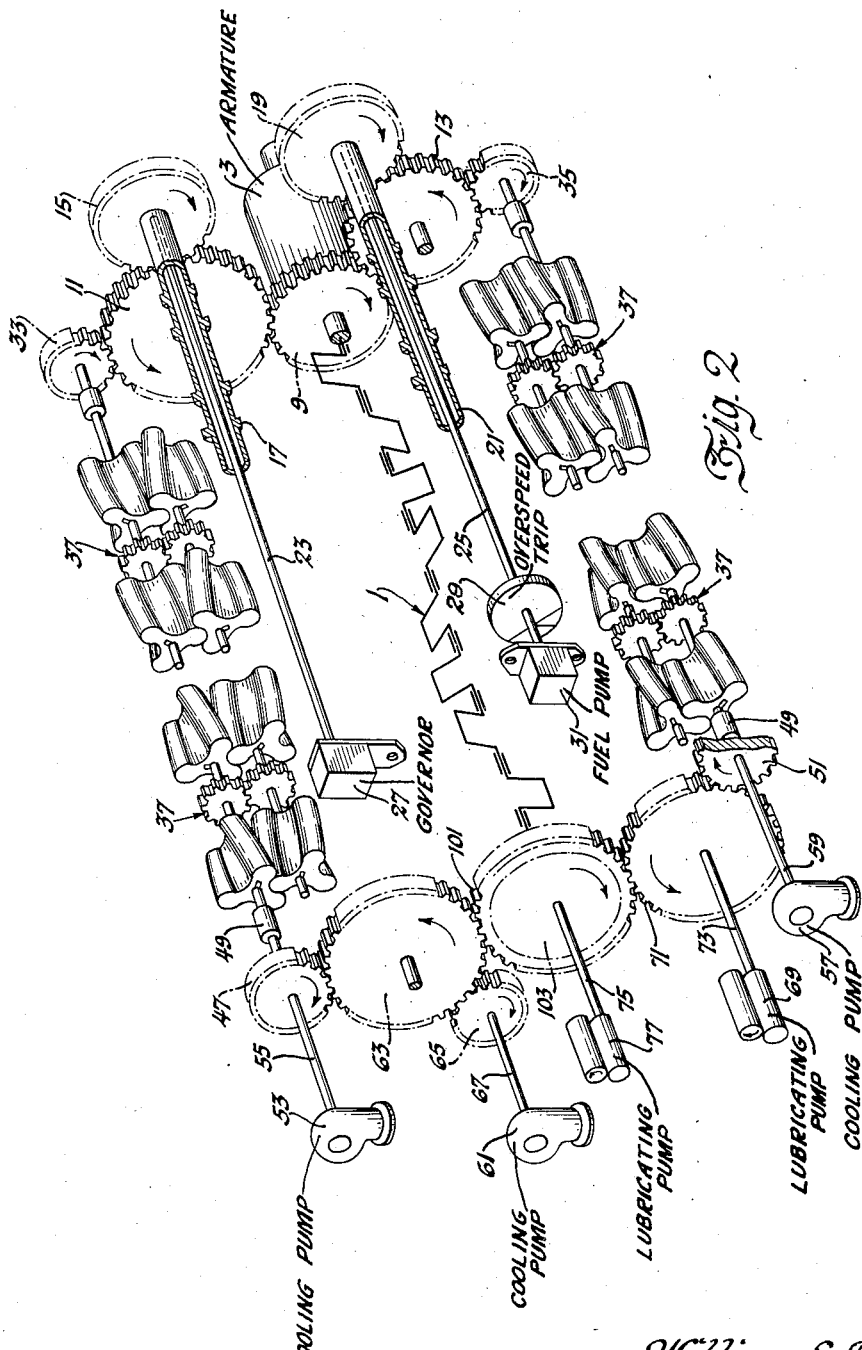

Patented July 16, 1946

2,403,905

UNITED STATES PATENT OFFICE 2,403,905

ENGINE ACCESSORY DRIVE

William Elmer Brill, Cleveland, Ohio, assignor to General Motors Corporation, Detroit, Mich., a corporation of Delaware Application November 13, 1942, Serial No. 465,454

4 Claims. (Cl. 123—195)

The present invention generally relates to prime movers and more particularly to accessory mounting and drives therefor.

The multiplicity of accessories required for prime movers of the internal combustion type having a multiplicity of working cylinders arranged in a plurality of cylinder banks entails problems of arrangement of the accessories and providing satisfactory drives therefor.

The principal object of the present invention is to provide an accessory grouping for a multicylinder engine which allows accessibility, interchangeability and small space requirements for the accessories and further permits groups of accessories to be driven by individual torsionally flexible shafts of small dimensions and adjustable couplings arranged parallel to, and operatively connected to the engine crankshaft whereby torsional oscillations in the combination of drive and driven shafts are effectively suppressed and increased engine efficiency is obtained.

The accessory arrangement and driving means by which the above objects are accomplished will be better understood by reference to the following detailed description thereof and the accompanying drawings illustrating accessory drive and arrangement which is particularly adapted for a multicylinder internal combustion engine of the compression ignition type in which groups of working cylinders are arranged in longitudinal radial rows or banks and the engine is operatively connected to drive an electric generator.

Figure 1 of the drawings is a schematic perspective view of an accessory arrangement and drive for an engine of the above type in which certain of the elements are broken away and shown in section, the accessories and drives being arranged in the same relative positions as mounted on the engine, and Figure 2 of the drawings is a view similar to that of Figure 1 showing an identical arrangement of the accessories but with a modified arrangement of drives therefor.

Referring now particularly to Figure 1, the engine crankshaft is indicated diagrammatically at 1, no cylinders being shown, however, they may be arranged in a plurality of longitudinal rows or banks extending radially with respect to the crankshaft 1. The main bearings of the crankshaft are shown diagrammatically and a rotary member such as a flywheel or generator armature 3 is shown directly connected to the crankshaft 1 adjacent the rear engine main bearing 5 which supports the front end of the armature for rotation and an outboard bearing and journal shown generally at 7 is provided for rotatably supporting the rear end of the armature.

The design of the crankshaft and rotary member directly connected thereto is such that there is a nodal point of the torsional oscillation of the combination adjacent the rear main engine bearing 5 and the rotary member 3, and an accessory driving gear 9 is fixed on the crankshaft at this nodal point. Two idler gears 11 and 13 are shown meshing with the driving gear 9 and each idler gear is supported in suitable bearings, not shown, on the engine for rotation on an axis parallel to the crankshaft axis. A gear 15 is shown meshing with the idler gear 11, the gear 15 being fixed on the rear end of a hollow camshaft 17 of the engine. Another gear 19 having a pitch diameter equal to the gear 15, is fixed on the rear end of another engine hollow camshaft 21, and is shown in mesh with the idler gear 13. Both camshafts are rotatably supported on separate axes parallel to the axis of the crankshaft 1 in aligned camshaft bearings located between adjacent banks of cylinders, not shown, for operation the overhead valve and fuel injector mechanisms located in the cylinder heads, not shown, in conventional manner.

Two torsionally resilient shafts 23 and 25 are shown connected directly to the gears 15 and 19, the shaft 23 being connected at its rear end to the gear 15 and the shaft 25 being connected at its rear end to the gear 19, and each of these shafts is shown extending forward through a respective hollow camshaft. The shaft 23 is operatively connected at its front end to a speed responsive engine governor shown generally at 27, located on the front end of the engine, for regulating the amount of fuel injected into the engine cylinders to vary the speed thereof. The front end of the shaft 25 is operatively connected to a speed responsive overspeed trip mechanism shown generally at 29 and to an engine fuel pump 31 also located on the front end of the engine. The speed responsive overspeed trip mechanism acts upon overspeeding of the engine to stop fuel injection to the engine cylinders in conventional manner in order to reduce the speed thereof to a safe value. The torsionally flexible shafts 23 and 25 prevent torsional oscillations of the camshafts 17 and 21 from reaching either of the speed responsive engine control devices 27 and 29 thereby preventing hunting of these devices and erratic control of the engine thereby.

Another pair of identical gears 33 and 35 are also shown in mesh with the idler gears 11 and 13 respectively. The gears 33 and 35 are each supported in bearings on either side of engine, not shown, for rotation about separate axes parallel to the crankshaft axis and each serves to drive interchangeable groups of accessories distributed along each side of the engine and also on the front end thereof through the following driving connections. Two twin blower units of the Roots type, shown generally at 37 are located on each side of the engine in axial alignment with each other. Each twin blower unit 37 comprises a pair of upper and a pair of lower rotors 39, each rotor being identical and having three helical lobes and an axial bore. A torsionally flexible shaft 41 is provided for each pair of upper and lower rotors and is shown extending through the axial bores therein. Each shaft 41 is splined or keyed only at points 43 to adjacent ends of the upper and lower rotors of each blower unit, the remaining portion of each shaft being free to twist in the aligned axial bores in the rotors. A timing gear 45 is also fixed to each of the torsionally resilient shafts 41 between the adjacent ends of the upper and lower pair of rotors 39 of each twin blower unit 37 and the shafts 41 are supported for rotation about axes parallel to the engine crankshaft 1 in suitable aligned bearings carried in the blower casings, not shown, so that the timing gears 37—45 of adjacent blower shafts 41 operate in constant mesh as do the upper and lower pairs of rotors 39.

The upper rotors of the blower units shown on one side of the engine in the upper portion of Figure 1 are located in axial alignment with the axis of the gear 33 and with a gear 47 supported in suitable bearings, not shown, located on the front end of the engine and the torsionally flexible shafts 41 for driving these upper rotors are connected by angularly adjustable couplings 49 with the gears 33 and 47. The couplings 49 may be of any well known type of shaft couplings comprising two members, each secured to separate aligned shafts and adapted to be connected together in different angular relations. The lower rotors of the blower units shown on the other side of the engine in the lower portion of Figure 1 are located in axial alignment with the axis of the gear 35 and with the gear 51 supported in suitable bearings, not shown, located adjacent the front end of the engine and the torsionally flexible shafts 41 for driving these rotors are likewise connected by identical angularly adjustable couplings 49 with the gears 35 and 51. The gears 33 and 35 located on opposite sides of the engine adjacent the rear end are identical with the gears 47 and 51 located on opposite sides of the engine adjacent the front end so that these gears are interchangeable as are each of the twin blower units 37 and the identical elements thereof. The angular adjustment of any rotor 39 with respect to any shaft 41 may be accomplished through the spline or keyed connection 43 therebetween and angular adjustment between the twin blower units 37 and gears 33, 35, 47 and 51 may be accomplished by the angularly adjustable couplings 49 so that the slight torsional oscillations present in the intermeshing helical rotors may be suppressed by proper phase relation of the rotors on one side of the engine with relation to the phase relation of rotors on the other side, the torsionally flexible driving and driven shafts act to absorb any small torsional vibrations present after proper phasing of the rotors. In addition to the advantages provided by the above described blower drive and arrangement separate air inlet and outlet ports are provided in each of the blower casings, not shown, adjacent each pair of intermeshing rotors, and each outlet port discharges into the hollow engine air box, not shown, surrounding the engine cylinders which are provided with the conventional scavenging and charging ports uncovered by the pistons, so that each cylinder is supplied with an equal amount of charging air, as four longitudinally spaced blower outlet ports are provided on each side of the engine air box.

The remainder of the engine accessories comprising lubricating and cooling pumps are mounted on the front end of the engine. The gear 47 is connected directly with a cooling pump 53 by a torsionally flexible shaft 55 and the gear 51 is likewise connected directly with another cooling pump 57 by a torsionally resilient shaft 59. The pumps 53 and 57 and the shafts 55 and 59 may or may not be identical as desired. The gear 47 also serves to drive another cooling pump 61 through an idler gear 63 and a gear 65 meshing therewith which is directly connected to the pump 61 by a torsionally resilient shaft 67. The gear 51 also drives double lubricating pump 69 for cooling the engine pistons and lubricating the accessory drives through a gear 71 meshing therewith and connected directly to the pump 69 by a torsionally flexible shaft 73. The gears 63, 65, and 71 are likewise mounted for rotation about axes parallel to the engine crankshaft in suitable bearings in the front end of the engine. A torsionally resilient shaft 75 is shown connected directly between the front end of the engine crankshaft 1 and a main lubricating pump 77 so that it is also protected from torsional oscillations.

The above described accessory arrangement shown in Figure 1 is identical with that shown in Figure 2, however, the driving means has been modified to permit certain of the accessories mounted on the sides and front end of the engine to be driven from the front end of the engine crankshaft. With the modified driving arrangement shown in Figure 2 the pumps 53, 57, 61 and 69 and the two twin blower units 37 mounted on the sides of the engine adjacent the front end are disconnected from the two rear twin units and are driven from the front end of the engine crankshaft along with the pumps 53, 61, 57 and 69 by means of a gear 101 fixed to the front end of the crankshaft by means of any well known type of torsionally flexible coupling generally shown at 103. With this arrangement the gear 101 is shown meshing with the gears 63 and 71 which mesh with the gears 47, 65 and 51 serving to drive the above mentioned pumps and two front twin blower units through the torsionally resilient shafts 55, 67, 59 and 73. The torsionally flexible coupling 103 is required to take care of any twisting of the front end of the crankshaft in relation to the rear end. With the arrangement shown in Figure 2 it is also possible to reduce the dimensions of the torsionally resilient shafts driving the above mentioned blowers and pumps and also the shafts driving the rear blower units as less torque is required where some are driven from the front end and others are driven from the rear end of the engine crankshaft. The accessories driven off of the rear end of the crankshaft in the modification shown in Figure 2 are not numbered as their arrangement and the driving means therefor are identical with that shown in Figure 1.

With either of the arrangements shown in Figures 1 and 2 all of the accessories may be grouped in an accessible position in the engine and be driven by torsionally flexible shafts parallel to the engine crankshaft and connected to a nodal point of the engine crankshaft oscillation to prevent wear and fatigue of the driving and driven means from any torsional oscillations in the system. Interchangeable blowers of small size may be distributed along and mounted on the sides of the engine providing uniform distribution of scavenging and charging air to the engine cylinders and the rotors of the respective blowers may be properly phased by means of angularly adjustable couplings to maintain constant air flow therefrom and thereby prevent torsional oscillation in the driving means therefor. The speed responsive control means may likewise be driven by means of torsionally resilient shafts to prevent hunting thereof and erratic operation of the engine. The combined accessory arrangement and driving means requires little space and is found to operate in a trouble free manner and enables the engine to operate with increased efficiency due to better air distribution and freedom from torsional oscillations in the combined driving and driven mechanisms. Other of said accessories may if desired be driven by torsionally resilient means connected to the crankshaft at other than the nodal point of torsional oscillation.

I claim:

1. An accessory drive for an internal combustion engine driving an electrical generator comprising a multi-throw engine crankshaft, a generator armature connected to one end of said crankshaft so that a nodal point in the torsional oscillation of said crankshaft is formed as a result of this connection, an engine camshaft operatively connected to the nodal point of said crankshaft, a plurality of engine accessories adapted to be driven by said crankshaft, said accessories comprising a plurality of Roots blowers, speed responsive engine speed controlling means and fuel, cooling and lubricating pumps, said blowers being axially spaced uniformly along side said crankshaft to provide uniform air distribution for said engine, torsionally resilient driving means for said accessories, and angularly adjustable couplings between said blowers and said torsionally resilient driving means therefor so that said blowers may be connected in proper angularly phased relation to suppress the torsional oscillations between said blowers.

2. An accessory drive for an internal combustion engine driving an electrical generator comprising a multi-throw engine crankshaft, a generator armature connected to one end of said crankshaft so that a nodal point in the torsional oscillation of said crankshaft is formed as a result of this connection, hollow engine camshafts operatively connected to said nodal point of said crankshaft, engine driven accessories comprising a plurality of Roots blowers, speed responsive speed controlling means and fuel, cooling and lubricating pumps, torsionally resiliently driving shafts for said speed controlling means and one said engine pumps, said driving shafts extending through said camshafts and operatively connected to the nodal point of said crankshaft, said Roots blowers being uniformly spaced axially along opposite sides of said crankshaft for providing uniform distribution of air to said engine, torsionally resilient driving shafts including angularly adjustable shaft couplings for connecting the axially aligned blowers to the nodal point of said crankshaft so that said blowers may be connected in proper angularly phased relation such that torsional oscillations therebetween are suppressed, and separate torsionally resilient shaft couplings between said crankshaft and each of said other engine pumps.

3. An accessory drive for an internal combustion engine driving an electrical generator comprising a multi-throw engine crankshaft, a generator armature connected to one end of said crankshaft so that a nodal point in the torsional oscillation of said crankshaft is formed as a result of this connection, a plurality of engine accessories adapted to be driven by said engine crankshaft, said accessories comprising a plurality of Roots blowers, speed responsive engine speed controlling means and engine fuel, cooling and lubricating pumps, said blowers being axially spaced uniformly along opposite sides of said crankshaft in order to provide uniform air distribution for said engine, torsionally resilient means for driving said accessories, certain of said torsionally resilient means being operatively connected to the nodal point of said crankshaft and other of said means being operatively connected to a point spaced therefrom, and angularly adjustable means between said blowers and said torsionally resilient driving means therefor whereby said blowers may be angularly phased to suppress the torsional oscillations between said blowers.

4. An accessory drive for an internal combustion engine driving an electrical generator comprising a multi-throw engine crankshaft, a generator armature connected to one end of said crankshaft so that a nodal point in the torsional oscillations of said crankshaft is formed as a result of this connection, hollow engine camshafts operatively connected to the nodal point of said crankshaft, torsionally resilient accessory driving shafts operatively connected to the nodal point of said crankshaft and extending through said camshafts, a plurality of sets of engine blowers of the Roots type, said sets of blowers being uniformly spaced axially along either side of said crankshaft in order to provide uniform air distribution for said engine, torsionally resilient driving means between said separate sets of blowers and said crankshaft, said blower driving means including angularly adjustable blower couplings so that sets of blowers may be connected in angularly phased relation to suppress torsional vibrations therebetween, and a plurality of separate torsionally resilient accessory driving means operatively connected to certain of said blower driving means and said crankshaft.

WILLIAM ELMER BRILL.